United States Patent [19]

Sassak

[11] Patent Number: 4,486,924
[45] Date of Patent: Dec. 11, 1984

[54] SINGLE EYE CLAMP

[75] Inventor: Frank Sassak, Grand Rapids, Mich.

[73] Assignee: McInerney Spring & Wire Co., Grand Rapids, Mich.

[21] Appl. No.: 492,879

[22] Filed: May 9, 1983

[51] Int. Cl.³ .................. B65D 63/02; F16L 33/10
[52] U.S. Cl. ............................ 24/277; 24/20 R;
       24/23 EE; 24/276; 24/278; 285/252; 285/382.2
[58] Field of Search .............. 24/277, 275, 276, 284,
       24/286, 285, 20 R, 20 EE, 21, 23 EE, 278, 16
                                   PB; 285/252, 382.2, 387, 365

[56] References Cited

U.S. PATENT DOCUMENTS

| | | |
|---|---|---|
| 235,931 | 12/1880 | Broughton .................. 24/276 |
| 660,245 | 10/1900 | Bunte et al. ................ 24/276 |
| 1,249,743 | 12/1917 | Gradl . |
| 1,600,765 | 9/1926 | Kenyon et al. .............. 24/277 |
| 1,782,680 | 11/1930 | Fay et al. .................. 24/284 |
| 2,241,042 | 5/1941 | Scarritt . |
| 2,449,795 | 5/1948 | Stillwagon . |
| 2,452,186 | 10/1948 | Fluharty .................... 24/277 |
| 2,970,799 | 2/1961 | Pinson ....................... 24/277 |
| 3,109,215 | 11/1963 | Brown . |
| 3,292,221 | 12/1966 | Baugh ........................ 24/484 |
| 3,891,294 | 6/1975 | Philibert .................. 24/20 R |
| 3,900,933 | 8/1975 | Engman et al. . |
| 3,919,747 | 11/1975 | Offterdinger .............. 24/277 |
| 4,147,384 | 4/1979 | Heckethorn . |
| 4,258,944 | 3/1981 | Wendel ..................... 285/387 |
| 4,281,863 | 8/1981 | Hall ........................ 285/382.2 |

FOREIGN PATENT DOCUMENTS 966992 8/1964 United Kingdom .............. 24/284

Primary Examiner—Victor N. Sakran
Attorney, Agent, or Firm—Cullen, Sloman, Cantor, Grauer, Scott & Rutherford

[57] ABSTRACT

A single eye clamp adapted to receive a pipe or a pair of telescoped pipes includes a ring body with its end portions being flattened upon one side extending radially outward of the body with the flattened ends in engagement and threaded. An apertured clamp anchor receives the outturned end and a fastener is threaded upon the outturned ends for peripherally contracting the body throughout 360° to secure the ring to the pipe or for securing the pipes together.

2 Claims, 12 Drawing Figures

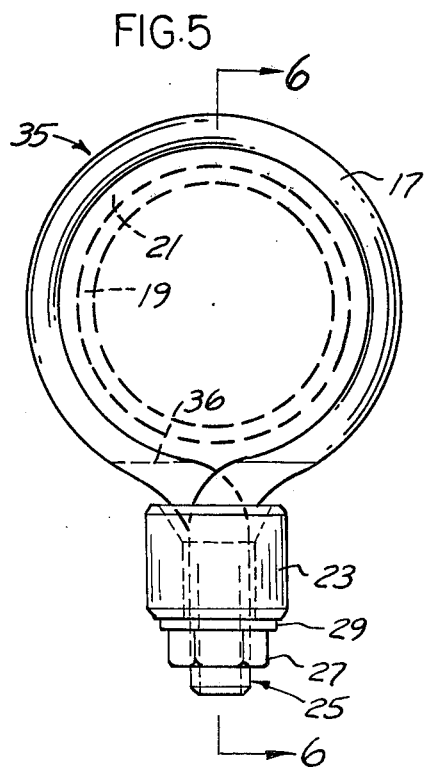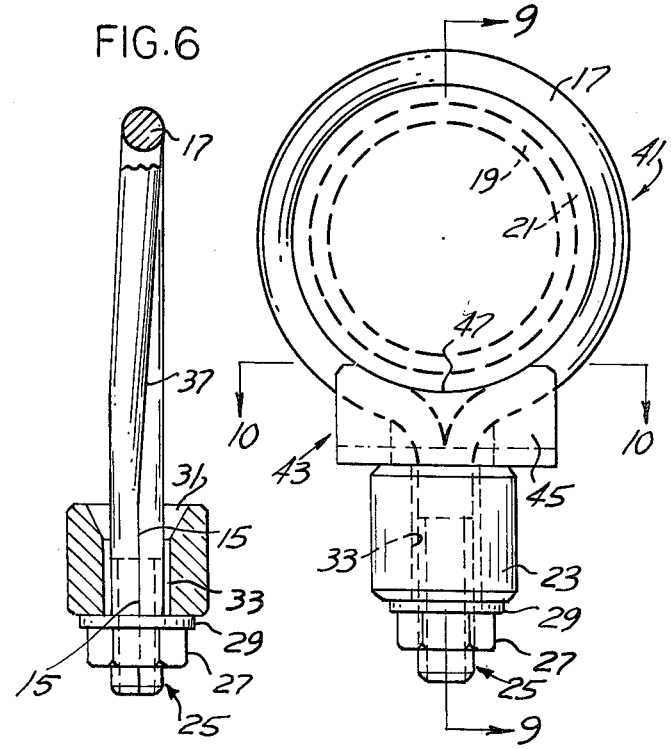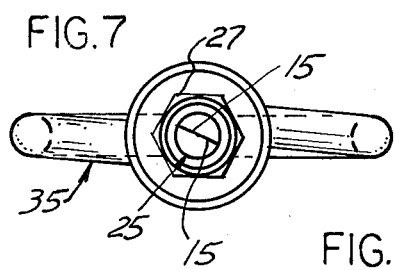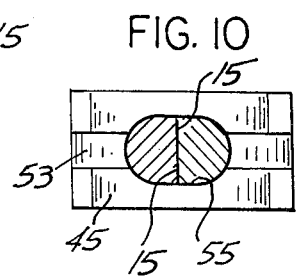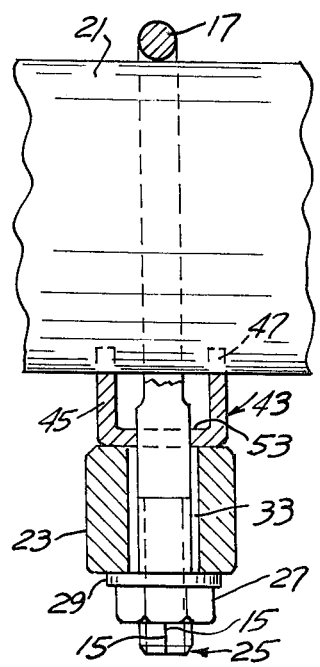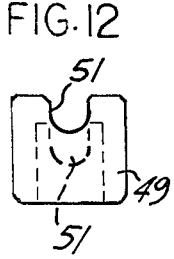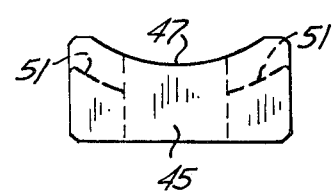

SINGLE EYE CLAMP

BACKGROUND OF THE INVENTION

In the field of clamps, the conventional clamp is usually formed into a U-shape with threaded ends which receive an apertured saddle and a pair of fasteners whereby a pair of telescoped engaging pipes extending through the U-clamp are secured together with the clamp secured to the pipes.

Clamps of this type have normally been constructed requiring the use of at least a pair of fasteners and bolts for snugly drawing the saddle which may conform to the interior shape of the clamp body to grip a pair of telescoped pipes which project through the clamp.

THE PRIOR ART

Examples of such clamps are shown in one or more of the following prior art patents:

|  | DATE | NAME |
| --- | --- | --- |
| U.S. PAT. NO. | | |
| 1,249,743 | 12/11/17 | Joseph Gradl |
| 2,241,042 | 6/6/41 | W. T. Scarritt |
| 2,449,795 | 9/21/48 | C. K. Stillwagon |
| 3,109,215 | 11/5/63 | R. S. Brown |
| 3,900,933 | 8/26/75 | Milton C. Engman |
| 4,147,384 | 4/3/79 | John E. Heckethorn |
| 4,281,863 | 8/4/81 | John F. Hall |
| German Patent | | |
| 25,393 | 1/17/34 | Bruno Patz in Zittau |

COPENDING PATENT APPLICATION

A single nut type of pipe clamp is shown in Applicant's copending patent application, Ser. No. 342,266, filed Jan. 25, 1982, entitled Pipe Clamp and Method of Clamping, Group Art 353.

SUMMARY OF THE INVENTION

An important feature of the present invention is to provide a single eye clamp adapted to receive a pipe or a pair of telescoped pipes which comprises a circular ring body formed from an elongated wire of circular cross section whose ends have been flattened on one side and which extend radially outward of the body and are exteriorly threaded to receive an apertured clamp anchor and a fastener.

A further feature is to provide an apertured clamp anchor adapted for abutting engagement with the circular ring body wherein the fastener when tightened into compressive engagement with the anchor is adapted to peripherally contract the ring body throughout 360° for securing the pipes together.

A further feature is to provide a single eye clamp wherein a single wire has ends on one side flattened, formed into a ring adapted to surround a pair of telescoped pipes, such as the pipes used for connecting a muffler to an exhaust pipe or an exhaust pipe to a muffler or to a catalytic converter or to a tail pipe of a vehicle, with the flattened ends outturned. An apertured saddle is mounted upon the outturned ends of the ring and a fastener is threaded onto the outturned engaging ends for operative compressive engagement with the saddle for peripherally shrinking the ring around the assembled pipes and for securing the pipes together. The saddle includes arcuately recessed side walls adapted for operative engagement with the adjacent pipe completing engagement with the pipe at the area where the ring body ends are outturned.

A further feature contemplates the formation of a circular ring body from an elongated wire of circular cross-section wherein end portions of the ring body are flattened on one side and extend radially outward in opposing engaging registry and are threaded to receive an anchor sleeve and a fastener. Said fastener is in operative compressive engagement with the ring body for contracting its interior diameter and wherein the ring body lies in a single plane.

These and other features and objects will be seen from the following specification and claims in conjunction with the appended drawings:

THE DRAWINGS

FIG. 5 is a side elevational view of an eye clamp, being a modification of an eye clamp shown in FIG. 1.

FIG. 6 is a vertical section taken in the direction of arrows 6—6 of FIG. 5.

FIG. 7 is a bottom plan view thereof.

FIG. 8 is a side elevational view of a modified single eye clamp similar to FIG. 1, but with a saddle interposed between the ring body and the clamp anchor.

FIG. 9 is a vertical section taken in the direction of arrows 9—9 of FIG. 8.

FIG. 10 is a plan view of the saddle shown in FIG. 8 with the end portions of the ring body extending therethrough and shown in section, as taken in the direction of arrows 10—10 of FIG. 8.

FIG. 11 is a side elevational view of the saddle.

FIG. 12 is an end elevational view thereof.

It will be understood that the above drawings illustrate merely preferred embodiments of the invention and that other embodiments are contemplated within the scope of the claims hereafter set forth.

DETAILED DESCRIPTION OF AN EMBODIMENT OF THE INVENTION

Figure 1:
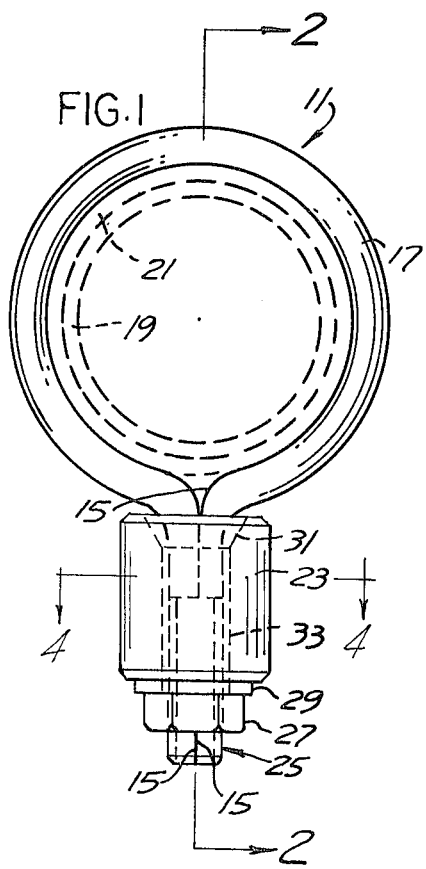
FIG. 1 is a side elevational view of the present single eye clamp with telescoped pipes extending therethrough.

A single eye clamp 11, FIG. 1, is constructed from an elongated rod or wire 13 of circular cross-section having end portions 15 which are flattened on one side. The clamp is constructed by forming the rod 13 into circular shape around a suitable die to form the eye, loop or ring body 17 with the flattened end portions 15 brought together upon their flattened sides and exteriorly threaded as at 25. The rod or wire 13 may be constructed of 1010 steel, for illustration. Other materials may be used, such as stainless steel or high carbon alloys.

Figure 2:
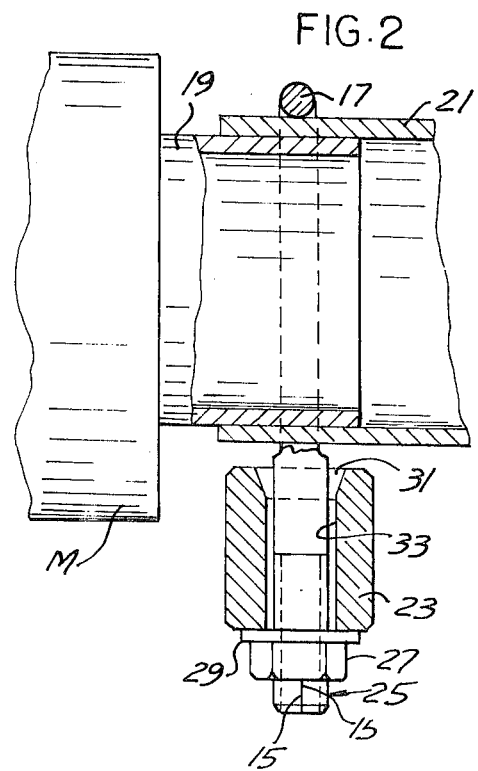
FIG. 2 is a section taken in the direction of arrows 2—2 of FIG. 1 illustratively showing a muffler outlet pipe and exhaust pipe connection for a vehicle.

The present single eye clamp may be used for connecting the outlet pipe 19 of a muffler M, fragmentarily shown in FIG. 2, to an overlapped telescoped exhaust pipe 21. The present single eye clamp may be used for interconnecting any adjacent telescoped pipes of an exhaust system as for example, the connection between a vehicle exhaust pipe and an inlet of a catalytic converter, the exhaust pipe of a catalytic converter and the tail pipe or the muffler outlet and a tail pipe.

The present eye clamp is not limited for use in exhaust connections for vehicles, but on the other hand may be used for securing to a single pipe or to a pair of overlapped telescoped pipes such as shown for illustration in FIGS. 1 and 2 for securing the pipes together and sealing them throughout 360°.

Outturned ends 15 with the ring body 13 with their flat sides in snug engagement are projected through the tapered recess 31 and the bore 33 of the clamp anchor 23. In use the ring body 17 is assembled over a pair of overlapped or telescoped pipes, such as pipes 19 and 21. The clamp anchor 23 is brought into abutting engagement with portions of the ring body, and the nut or other fastener 27 threaded onto the ends 15 and brought into operative compressive engagement with clamp anchor 23. A suitable lock washer 29 is interposed. The ends of body 17 are tensioned.

Tightening of the fastener is adapted to peripherally contract the ring body throughout 360° for securing the ring to the pipe or for securing the ring body to a pair of telescoped pipes 19 and 21 such as shown in FIG. 2 and for securing the pipes together. The inwardly tapered recess 31 on the clamp anchor is adapted to cooperatively receive the outturned end portions 15 of the body 17 so that portions of the clamp anchor will be in operative engagement with the ring body.

Figure 4:
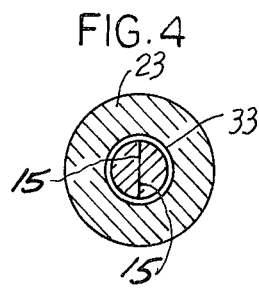
FIG. 4 is a section taken in the direction of arrows 4—4 of FIG. 1.
Figure 3:
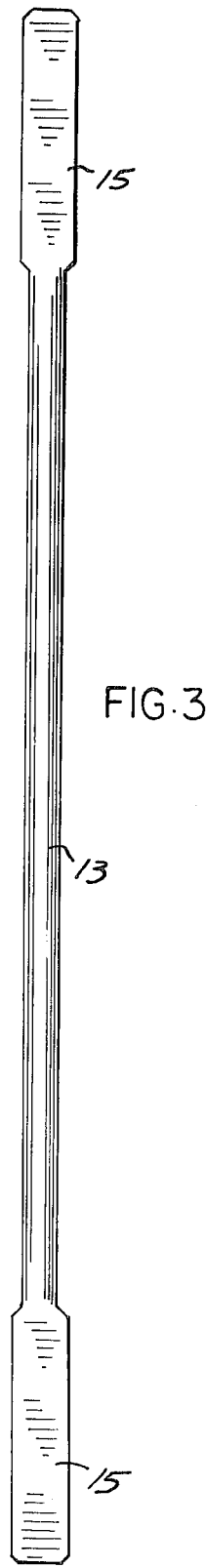
FIG. 3 is a side elevational view of the wire strip with flattened ends from which the present eye clamp is formed.

Since the end portions 15 of the rod or wire 13 are flattened upon one side, the exterior surface of said end portions is semi-circular FIG. 4, in order to accept the threading 25 over which the fastener 27 is mounted. In FIG. 1 the ring body 17 lies in a single plane which includes its outturned flattened ends 15.

MODIFICATION

A modified single eye clamp 35 is shown in FIGS. 5, 6 and 7 wherein the construction of the ring body is substantially similar to that described with respect to FIG. 1. In this case, however, the ring body does not lie in a single plane as shown in FIG. 6. The outturned end portions 15 are laterally displaced and twisted as along the twist line 36, FIG. 5. The flattened sides of end portions 15 are in cooperative engagement and exteriorly threaded, FIG. 7, to receive the fastener 27. Elongated clamp anchor 23 is apertured at 33 and has an inwardly inclined tapered recess 31 which receives the flattened ends 15 of the ring body. The fastener 27 is threaded onto ends 15 and is in compressive engagement with anchor 23.

Since the flattened end portions 15 are laterally displaced, they are twisted so that the flat surfaces thereof are in engagement, FIG. 7, and exteriorly threaded at 25 to receive fastener 27.

MODIFICATION

A modified single eye clamp 41 is shown in FIG. 8 formed from a single rod or wire 13 of circular cross-section formed into the ring body 17 and adaped to surround a pipe 21, or a pair of telescoped pipes 19 and 21 for clamping and sealing them together. The flattened ends 15 of the ring body 17 are outturned with respect to the ring body and exteriorly threaded as at 25 adapted to receive threaded fastener 27 with lock washer 29.

The construction of the eye clamp, FIG. 8, is substantially the same as that described with respect to FIG. 1 and the details thereof are not repeated.

Elongated saddle 43 has opposed side walls 45 with concave recessess 47 upon their upper edges, FIGS. 10 and 11, adapted for cooperative bridging engagement with pipe 21 at the ends of the body adjacent its outturned ends. Said saddle has end walls 49, FIG. 12 and extending therethrough inwardly and downwardly inclined recesses 51 concave in cross-section.

The saddle includes the bottom wall 53, FIG. 8, having an elliptical recess 55 therein, FIG. 10, adapted to cooperatively receive the opposed engaging threaded outturned ends 15 of said ring body. The elongated clamp anchor sleeve 23 is apertured at 33 and cooperatively receives engaging outturned clamp ends 15.

Fastener 27 threaded upon the ends 15 is adapted to operatively engage saddle 43 which in turn operatively and compressively engages portions of the ring body 17 adjacent its outturned ends 15 so as to peripherally contract the ring body 17 throughout 360° in tension for securing the ring body to the pipe 21 or to the pair of telescoped engaging pipes 19 and 21, FIG. 2 and for securing said pipes together.

The purpose of the saddle is to complete a 360° contact with the tube 21 as a nut 27 is drawn tightly against the anchor 23. The saddle 43 will come in operative contact with the ring body 17 for operative engagement with the pipe 21 throughout 360°. The fastener functions to contract the ring body throughout 360°.

In the clamp shown in FIG. 8, clamp anchor 23 could be omitted with the fastener 27 in operative engagement with saddle 43.

Having described my invention, reference should now be had to the following claims.

I claim:

1. A single eye clamp adapted to receive a pipe or a pair of telescoped pipes comprising a circular ring body of circular cross-section;

end portions on said body being flattened upon one side, extending radially outward of said body with their flattened sides in engagement and threaded;

an apertured clamp anchor through which said flattened ends project, with said anchor abutting said ring;

said clamp anchor being an elongated sleeve of circular cross-section having a bore, at one end terminating in an outwardly tapered recess for cooperative registry with said ring at its junction with its end portions;

and a fastener threaded upon said ends in operative compressive engagement with said anchor adapted to peripherally contract said ring throughout 360°, securing said ring to said pipe;

said ring body and end portions being formed from a straight wire of circular cross-section.

2. In the clamp of claim 1, an apertured saddle receiving said ring end portions interposed between said clamp anchor and said ring, said saddle having side walls, at their upper edges having a concave recess to cooperatively receive and supportably engage portions of said pipe at the outturned end portions assuring supporting engagement of said pipe throughout 360°;

and end walls upon said saddle, each end wall having a downwardly and inwardly inclined channel of semi-circular cross-section to supportably receive portions of said ring body adjacent its outturned end portions.

* * * * *